(12) United States Patent
Strohl et al.

(10) Patent No.: US 8,573,942 B2
(45) Date of Patent: Nov. 5, 2013

(54) AXIAL RETENTION OF A PLATFORM SEAL

(75) Inventors: James Page Strohl, Stuart, FL (US); RuthAnn Rawlings, Stuart, FL (US)

(73) Assignee: Alstom Technology Ltd., Baden (CH)

( * ) Notice: Subject to any disclaimer, the term of this patent is extended or adjusted under 35 U.S.C. 154(b) by 1378 days.

(21) Appl. No.: 12/277,471

(22) Filed: Nov. 25, 2008

(65) Prior Publication Data

US 2010/0129226 A1 May 27, 2010

(51) Int. Cl.
*B63H 1/20* (2006.01)
*B63H 13/00* (2006.01)

(52) U.S. Cl.
USPC .................... 416/219 R; 416/221; 416/220 R

(58) Field of Classification Search
USPC ........... 416/219 R, 221, 220 R; 277/641, 312
See application file for complete search history.

(56) References Cited

U.S. PATENT DOCUMENTS

| 8,393,869 B2 * | 3/2013 | Kim et al. | 416/219 R |
| 2009/0142195 A1 * | 6/2009 | Brittingham et al. | 416/223 A |
| 2010/0111700 A1 * | 5/2010 | Kim et al. | 416/219 R |

* cited by examiner

*Primary Examiner* — Nitin Parekh
(74) *Attorney, Agent, or Firm* — Shook, Hardy & Bacon L.L.P.

(57) ABSTRACT

A gas turbine engine component having an axial pin stop assembly that reduces stress around a seal pin damper slot between a platform and a buttress is disclosed. The seal pin damper slot is extended to the leading edge of the buttress and an axial pin stop seal extends into the pin damper slot to limit movement of the seal pin damper while relieving stress concentration at the interface between the buttress and platform.

20 Claims, 6 Drawing Sheets

AXIAL RETENTION OF A PLATFORM SEAL

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to gas turbine engines. More particularly, embodiments of the present invention relate to an apparatus and method for an axial pin seal assembly for use with a turbine blade.

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises an inlet that directs air to a compressor section, which has stages of rotating compressor blades. As the air passes through the compressor, the pressure of the air increases. The compressed air is then directed into one or more combustors where fuel is injected into the compressed air and the mixture is ignited. The hot combustion gases are then directed from the combustion section to a turbine section by a transition duct. The hot combustion gases cause the stages of the turbine to rotate, which in turn, causes the compressor to rotate.

Referring initially to FIGS. 1 and 2, a portion of a gas turbine blade 100 in accordance with the prior art is shown. The gas turbine blade 100 comprises an attachment 105, a root 110 and an airfoil 115. The root 110 of the gas turbine blade 100 comprises a seal pin damper slot 125 encapsulated by a platform 120 and buttresses 130. The buttresses 130 at the leading edge and trailing edge of the encapsulated seal pin damper slot 125 are part of a buttress 130 continuously connected to the platform 120 and root 110.

When a gas turbine blade 100 is in use, there is a significant temperature difference between the platform 120 and the buttress 130. Due to the continuous connection between the platform 120 and the buttress 130 as shown in the prior art, there is a high concentration of stress at the platform cooling slots due to the significant temperature difference between the platform 120 and the buttress 130. These high stresses can cause cracking around the connection between the platform 120 and the buttress 130.

BRIEF SUMMARY OF THE INVENTION

In accordance with the present invention, there is provided a novel configuration for a gas turbine engine component having a seal pin damper slot with an axial pin stop assembly. The axial pin stop assembly allows the seal pin damper slot to be extended to the leading edge of the buttress, an improvement that further enhances a temperature buffer between a buttress and a platform while reducing stress levels in the gas turbine blade.

In an embodiment of the present invention, an axial pin seal assembly comprises a generally axially extending seal pin damper slot extending to a forward face of a buttress of the turbine blade. A generally radially extending pin stop slot in the buttress intersects the seal pin damper slot. A generally cylindrical seal pin is placed within the seal pin damper slot and an axial stop pin is secured within the pin stop slot, wherein the axial stop pin limits axial movement of the seal pin. The seal pin is flush with a platform mateface surface. The pin seals a leak that is opened up when the seal slot is opened through the leading edge of the buttress surface.

In an alternative embodiment, a gas turbine blade incorporating an improved sealing surface is disclosed. The turbine blade comprises an attachment and with a neck portion extending radially outward from the attachment and having one or more buttresses. A platform portion extends radially outward from the neck with a seal pin damper slot extending along a sideface of the platform to a leading edge of the buttress. A generally radially extending pin stop slot in the buttress intersects the seal pin damper slot. A generally cylindrical seal pin is located within the seal pin damper slot, and an axial stop pin is fixed within the pin stop slot.

In yet another embodiment, a method for sealing gaps between adjacent turbine blades in a gas turbine engine is disclosed. The method comprises undercutting a portion of a buttress proximate the leading edge of the turbine blade. The method also comprises placing a generally axially extending seal pin damper slot in a buttress and platform region of the turbine blade, wherein the slot extends to a forward face of the turbine blade. The method further comprises placing a generally radially extending pin stop slot in the buttress such that the pin stop slot intersects with a seal pin damper slot. The method further comprises securing an axial stop pin within the pin stop slot and placing a generally cylindrical seal pin within the seal pin damper slot. It should be noted that the steps in the method need not be performed in the order disclosed, but may also be performed in any allowable permutation of the disclosed steps.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
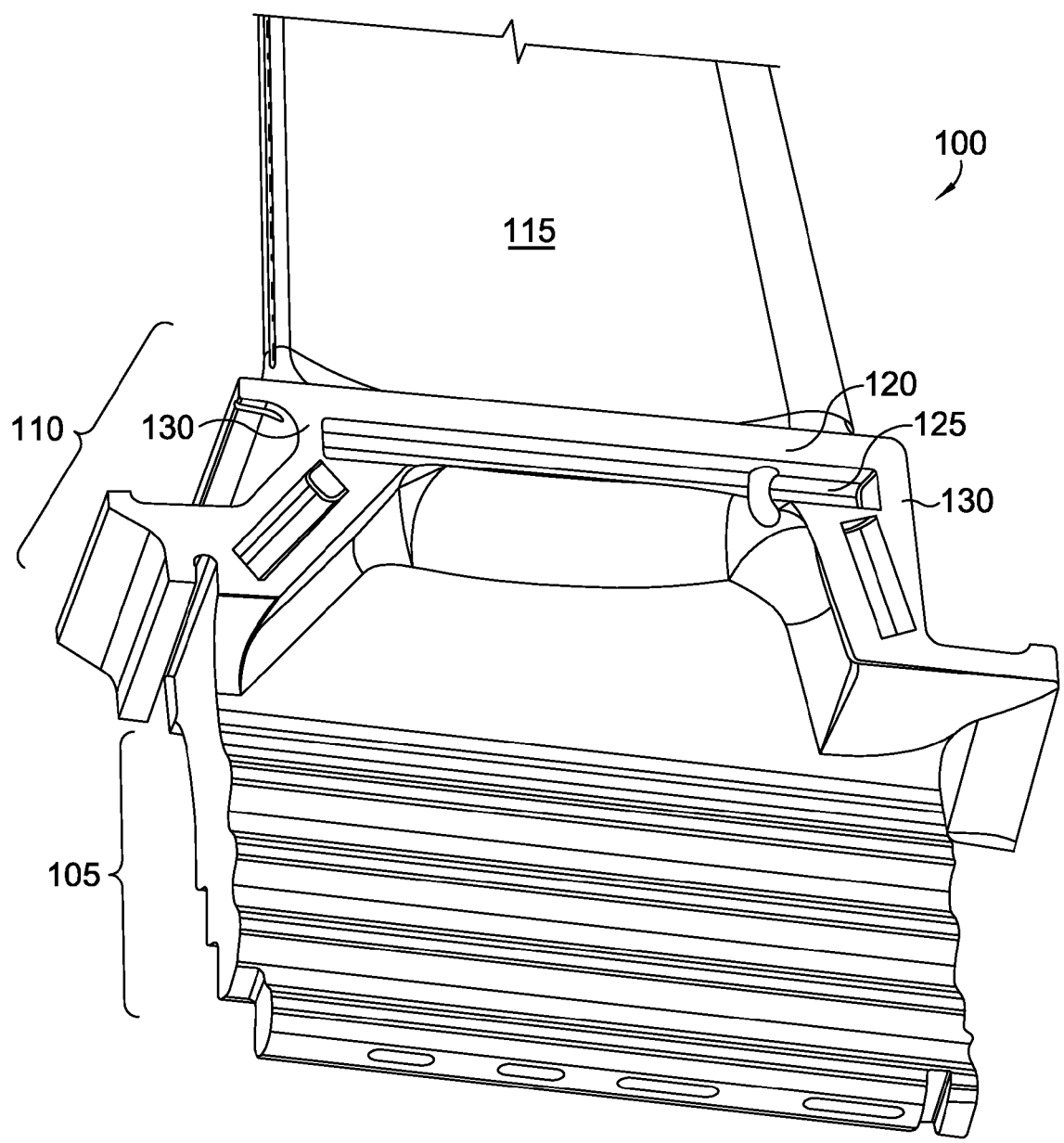
FIG. 1 is a perspective view of a portion of a gas turbine blade comprising an encapsulated axial seal pin damper slot of the prior art.
Figure 2:
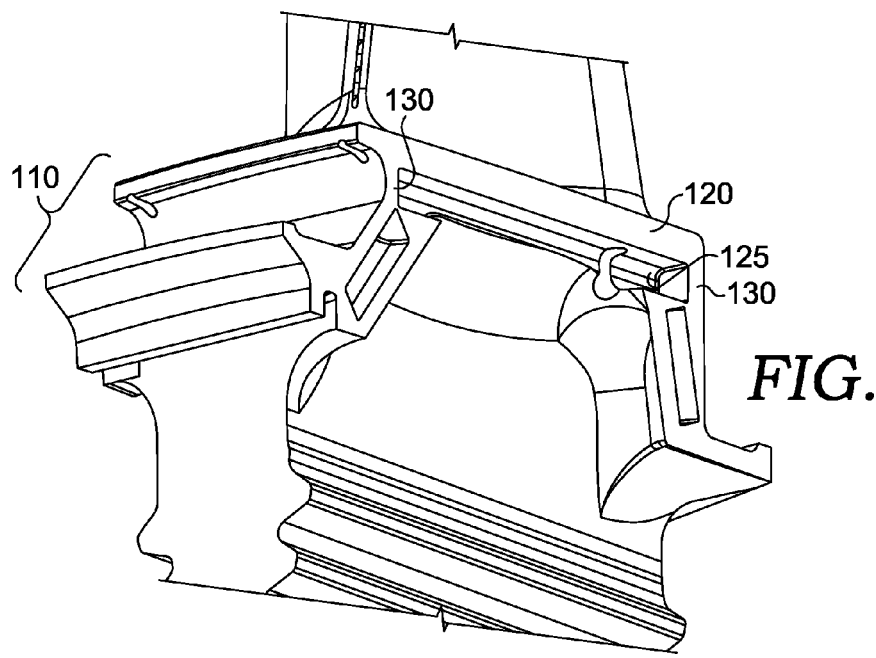
FIG. 2 is an alternate perspective view of a portion of a gas turbine blade comprising an encapsulated axial seal pin damper slot of the prior art.

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Referring to FIGS. 3-7, a gas turbine blade 300 is shown according to an embodiment of the present invention. A gas turbine blade 300 includes an attachment 305; a neck portion 310 extending radially outward from the attachment 305 and having one or more buttresses 330. A platform portion 320 extends radially outward from the neck 310 and has a seal pin damper slot 325 extending along a sideface of the platform 320, with the slot 325 extending to a leading edge of the buttress 330. A generally radially extending pin stop slot 335 is located in the buttress 330 and intersects the seal pin damper slot 325 while a generally cylindrical seal pin 345 is located within the seal pin damper slot 325 and, an axial stop pin 340 fixed within the pin stop slot 335.

Figure 3:
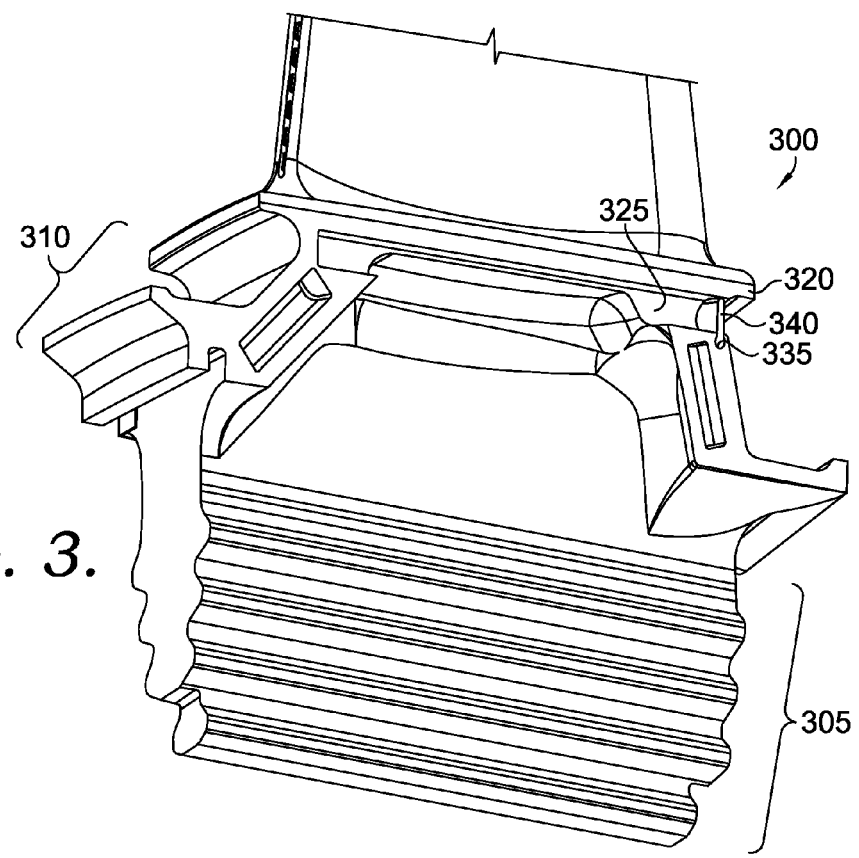
FIG. 3 is a perspective view of a portion of a gas turbine blade in accordance with an embodiment of the present invention.
Figure 4:
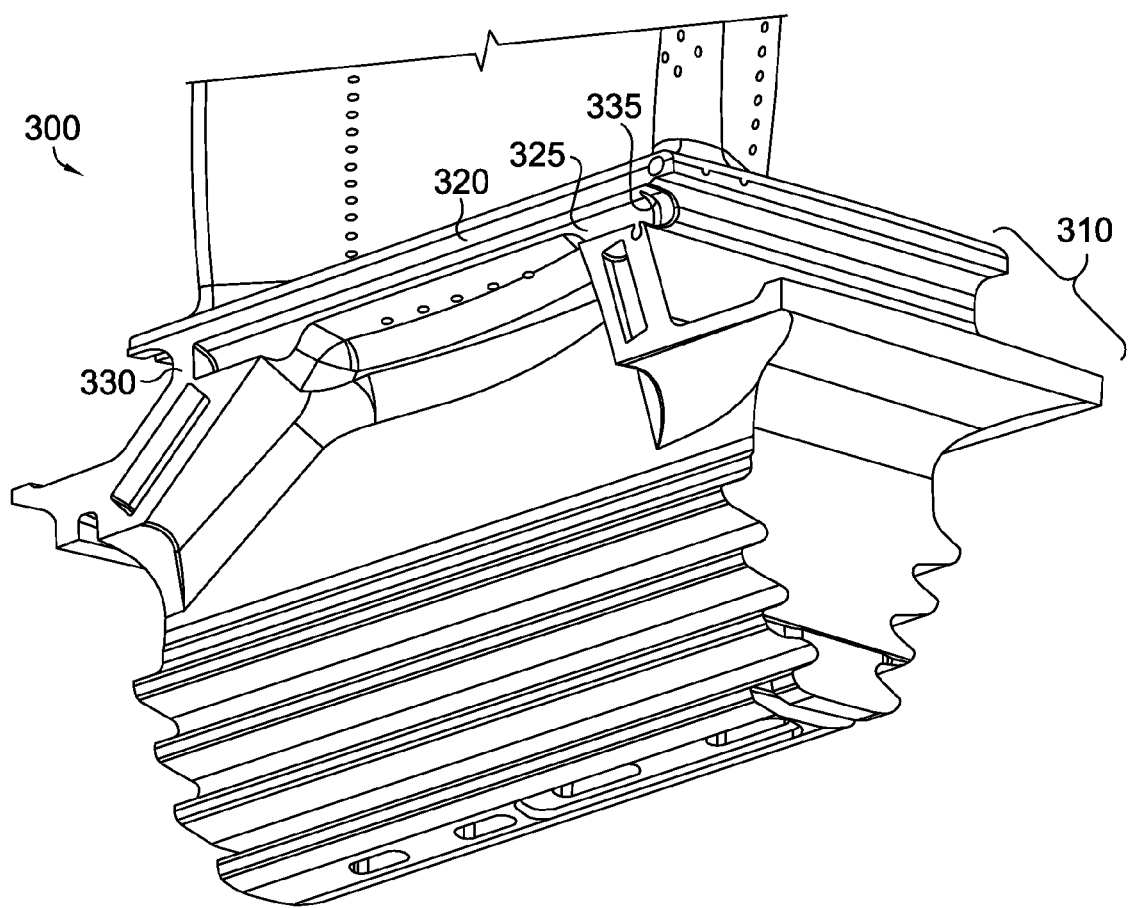
FIG. 4 is an alternative perspective view of a portion of a gas turbine blade in accordance with an embodiment of the present invention.
Figure 5:
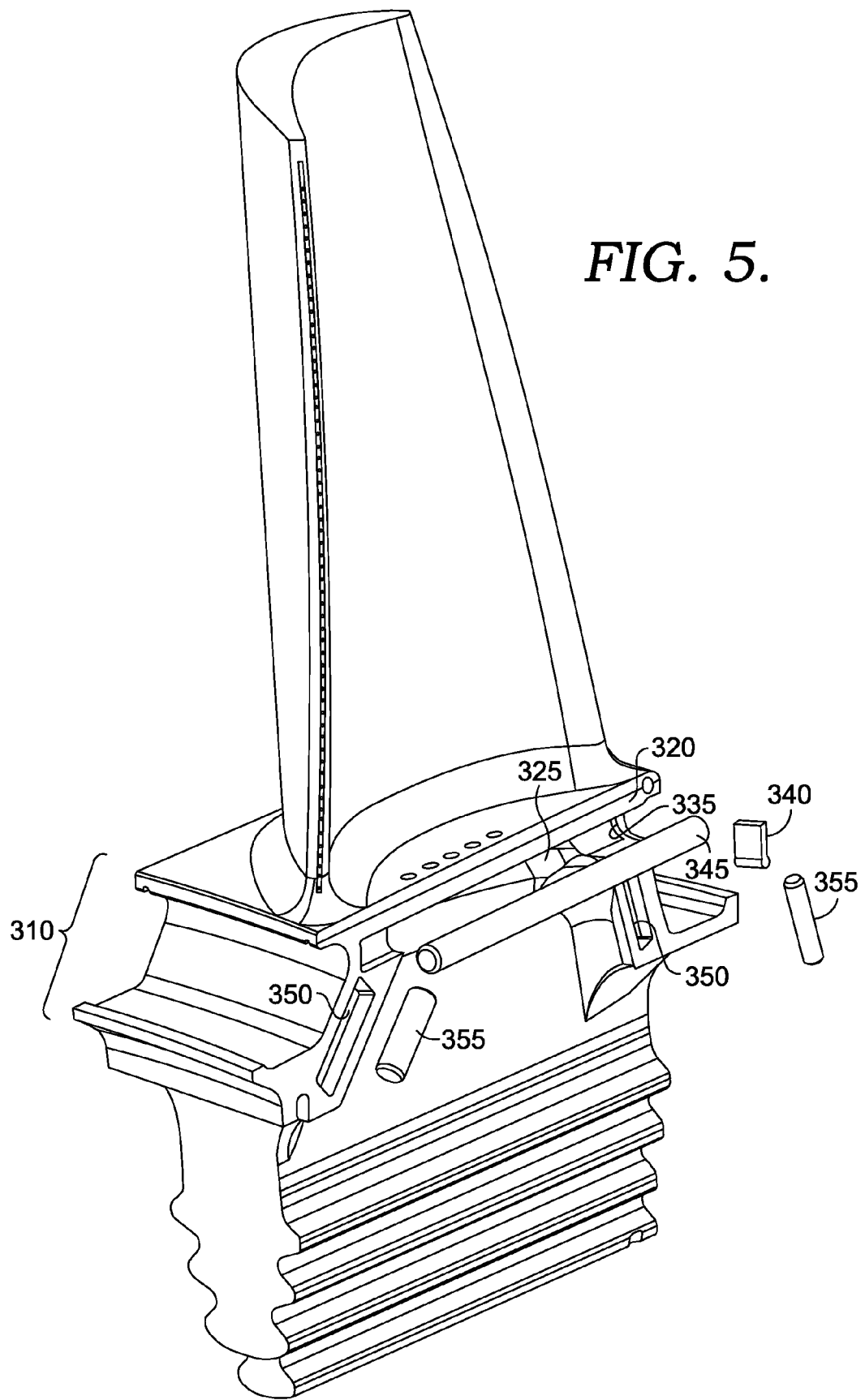
FIG. 5 is an exploded view of a gas turbine blade in accordance with an embodiment of the present invention.
Figure 6:
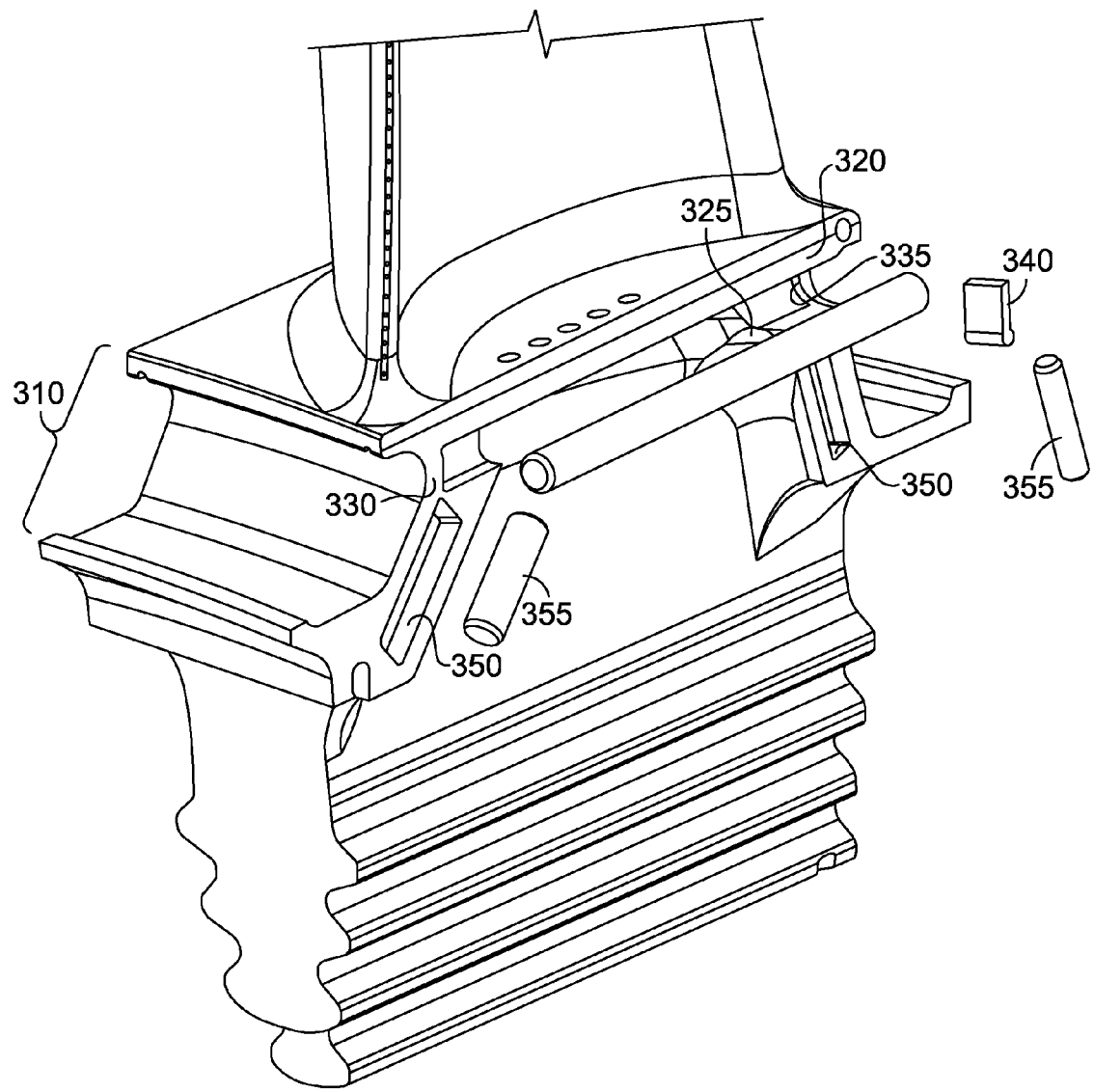
FIG. 6 is a detailed exploded perspective view of a portion of a gas turbine blade in accordance with an embodiment of the present invention; and, FIG. 7 is another detailed perspective view of a portion of a gas turbine blade in accordance with an embodiment of the present invention.
Figure 7:
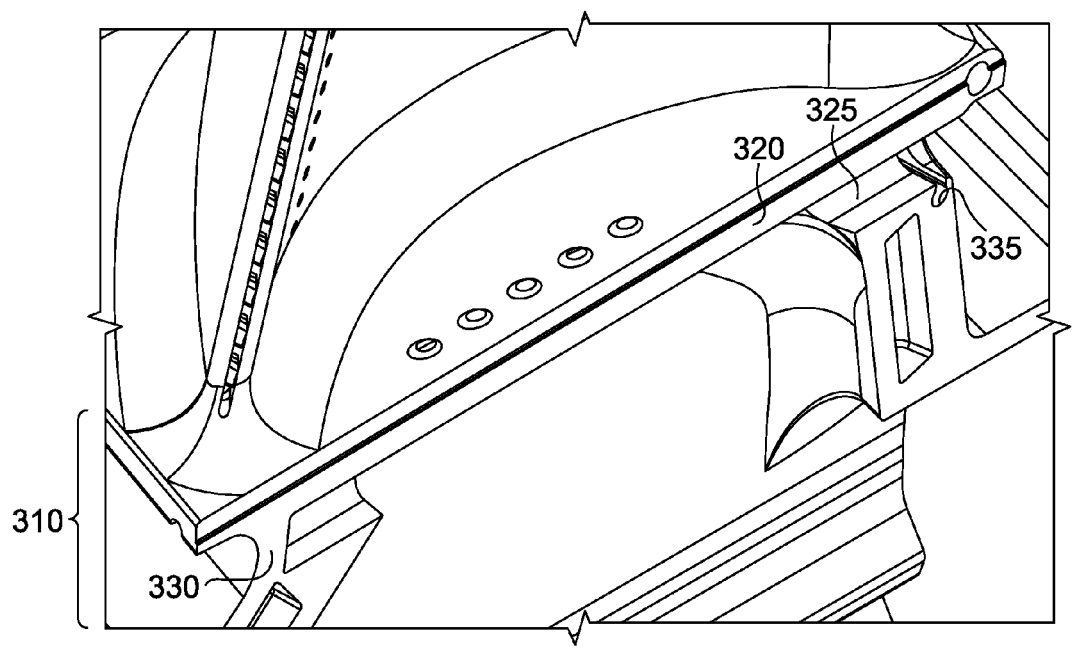

In an effort to reduce the effect of the thermal gradient between the platform 320 and the buttress 330, the gas turbine blade 300 as seen in FIG. 3 comprises an axial seal pin damper slot 325 to effectively separate the platform 320 from the buttress 330. In the gas turbine blade 300, the buttress 330 may be modified by undercutting material from the leading edge of the turbine blade. In another embodiment, the buttress 330 may be undercut along the pressure side of the turbine blade. In an alternative embodiment, the buttress 330 may be undercut along the pressure side of the turbine blade and along the leading edge of the turbine blade, wherein the two undercuts may intersect. Undercutting material from the buttress 330 reduces the amount of cold buttress material coming in direct contact with the platform 320, effectively decoupling the platform 320 from the buttress 330. With the platform 320 decoupled from the buttress 330, the shank of the blade is isolated from the platform 320.

Material may also be removed from a portion of the buttress 330 to form an axial damper slot 325 that extends to the leading edge of the buttress 330. This increases the slot size as a means of decoupling the platform 320 from the buttress 330. In an alternative embodiment, the axial seal pin damper slot 325 may also or alternatively be extended towards the trailing edge as a means of decreasing the temperature gradient between the platform 320 and the buttress 330.

In an alternative embodiment, the axial seal pin damper slot 325 may extend along a majority of an axial length of the platform 320. The axial seal pin damper slot 325 may also be generally perpendicular to the axial pin stop slot 335. While the axial pin stop 340 limits the movement of the seal pin 345 to the length of the seal pin damper slot 325, the seal pin 345 may continue to move axially between an end of the seal pin damper slot 325 and the axial stop pin 340.

The invention further comprises an axial pin seal assembly to keep the seal pin 345 within the seal pin damper slot 325. An axial pin seal assembly for use with a gas turbine blade 300 is disclosed, comprising a generally axially extending seal pin damper slot 325 extending to a forward face of a buttress 330 of the gas turbine blade 300 and a generally radially extending pin stop slot 335 in the buttress 330 that intersects with the seal pin damper slot 325. A generally cylindrical seal pin 345 is placed within the seal pin damper slot 325 and an axial stop pin 340 is secured within the pin stop slot 335 such that the axial stop pin 340 limits axial movement of the seal pin 345. Further locations of thermal separation occur via slots 350 which are oriented at an angle relative to the seal pin damper slot 325. Each slot 350 contains a damper pin 355 similar in construction to that of seal pin 345.

The axial pin stop assembly prevents the seal pin 345 exiting the seal pin damper slot 325 at the forward end of the slot. To do this, the axial stop pin 340 may be permanently affixed into the pin stop slot 335. In one embodiment of the present invention, the axial stop pin 340 is brazed into the pin stop slot 335. The axial pin stop 340 may also be removably affixed into the axial pin stop slot 335. The axial pin stop 340 may alternatively be retained by an adjacent blade. The axial pin stop 340 may alternatively be welded into place. In another alternative, the axial pin stop 340 may be fit with an interference fit.

In another embodiment, the axial pin stop 340 partially blocks the seal pin damper slot 325. The axial pin stop slot 335 may also intersect completely with the seal pin damper slot 325 and slide into a portion of the platform 320.

In addition to working as a seal, the axial pin stop 340 may also work as a means to keep a seal pin 345 in place, the axial pin stop 340 may also work as an air seal by completely blocking air from exiting the seal pin damper slot 325 towards the leading edge of the blade 300. The axial pin stop 340 may also work to reduce leakage of cooling flow passing through the seal pin damper slot 325. In either case, the axial pin stop 340 may extend into the platform 320. The axial stop pin 340 and axial pin stop slot 335 may also include a radial retention component to aid in keeping the axial pin stop 340 in the axial pin stop slot 335.

The present invention also provides a method of sealing gaps between adjacent platforms through undercutting a portion of a buttress proximate the blade leading edge and placing a generally axially extending seal pin damper slot in a buttress and platform region of the turbine blade. Undercutting portions of the buttress for stress reduction create leakage areas that must be sealed. The slot created preferably extends to a forward face of the turbine blade and by placing a generally radially extending pin stop slot in the buttress such that the pin stop slot intersects with a seal pin damper slot an axial stop pin can be secured within the pin stop slot. This ensures that a generally cylindrical seal pin remains within the seal pin damper slot.

In an embodiment of the present invention, the seal pin damper slot 325 may be machined into a turbine blade. The seal pin damper slot 325 may also or alternatively be cast into a turbine blade. In a similar manner, the axial pin stop slot 335 may be machined into or cast into cast turbine blade. When forming an axial pin stop slot 335, the axial pin stop slot 335 is flush with the mateface of the buttress 330/platform 320. In this way, the addition of an axial pin stop slot 335 does not interface with adjacent turbine blades 300 in the assembly of a turbine rotor.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An axial pin seal assembly, comprising:
   a substantially axially extending seal pin damper slot extending to a forward face of a buttress;
   a substantially radially extending pin stop slot in the buttress and intersecting the seal pin damper slot;
   a substantially cylindrical seal pin placed within the seal pin damper slot; and,
   an axial stop pin secured within the pin stop slot;
   wherein the axial stop pin limits axial movement of the seal pin.

2. The axial pin seal assembly of claim 1, wherein the pin stop slot and axial stop pin includes a radial retention component.

3. The axial pin seal assembly of claim 2, wherein the axial stop pin is brazed into the pin stop slot.

4. The axial pin seal assembly of claim 1, wherein the axial pin stop partially blocks the seal pin damper slot.

5. The axial pin seal assembly of claim 1, wherein the axial pin stop completely intersects with the seal pin damper slot.

6. The axial pin seal assembly of claim 5, wherein the pin stop slot extends into the platform.

7. The axial seal pin assembly of claim 1, wherein the axial stop pin reduces leakage of a cooling flow passing through the seal pin damper slot.

8. A gas turbine blade assembly comprising:
   an attachment;
   a neck extending radially outward from the attachment and having one or more buttresses;
   a platform extending radially outward from the neck;
   a seal pin damper slot extending along a sideface of the platform to a leading edge of the buttress;
   a generally radially extending pin stop slot in the buttress and intersecting the seal pin damper slot;
   a generally cylindrical seal pin located within the seal pin damper slot; and,
   an axial stop pin fixed within the pin stop slot.

9. The gas turbine blade assembly of claim 8, wherein the seal pin generally blocks air from entering the damper slot.

10. The gas turbine blade assembly of claim 8, wherein the damper slot extends along a majority of an axial length of the platform.

11. The gas turbine blade assembly of claim 8, wherein the damper slot and the pin stop slot are generally perpendicular.

12. The axial pin seal assembly of claim 8, wherein the pin stop slot and axial stop pin include a radial retention component.

13. The axial pin seal assembly of claim 12, wherein the axial stop pin is brazed into the pin stop slot.

14. The axial pin seal assembly of claim 13, wherein the axial stop pin is retained by an adjacent blade.

15. The gas turbine assembly of claim 13, wherein the seal pin can move axially between an end of the seal pin damper slot and the axial stop pin.

16. A method of sealing gaps between adjacent turbine blades in a gas turbine engine, comprising:
   undercutting a portion of a buttress proximate its leading edge;
   placing a substantially axially extending seal pin damper slot in a buttress and platform region of the turbine blade, wherein the slot extends to a forward face of the turbine blade;
   placing a substantially radially extending pin stop slot in the buttress such that the pin stop slot intersects with a seal pin damper slot;
   securing an axial stop pin within the pin stop slot; and,
   placing a substantially cylindrical seal pin within the seal pin damper slot.

17. The method of claim 16, wherein the seal pin damper slot and pin stop slot are machined into a cast turbine blade.

18. The method of claim 16, further comprising undercutting a portion of a buttress proximate a pressure side.

19. The method of claim 16, wherein the pin stop slot includes a radial retention feature.

20. The method of claim 16, wherein the seal pin can move axially within the seal pin damper slot.

* * * * *